United States Patent
Fukawa

(10) Patent No.: US 9,444,966 B2
(45) Date of Patent: Sep. 13, 2016

(54) IMAGE READING APPARATUS AND IMAGE READING METHOD

(71) Applicant: CANON KABUSHIKI KAISHA, Tokyo (JP)

(72) Inventor: Kimihiko Fukawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/754,208

(22) Filed: Jun. 29, 2015

(65) Prior Publication Data
US 2016/0028916 A1    Jan. 28, 2016

(30) Foreign Application Priority Data
Jul. 28, 2014    (JP) ................................. 2014-153151

(51) Int. Cl.
| | |
|---|---|
| H04N 1/04 | (2006.01) |
| H04N 1/12 | (2006.01) |
| H04N 1/00 | (2006.01) |
| H04N 1/10 | (2006.01) |
| H04N 1/19 | (2006.01) |
| H04N 1/203 | (2006.01) |
| H04N 1/23 | (2006.01) |

(52) U.S. Cl.
CPC .......... *H04N 1/125* (2013.01); *H04N 1/00013* (2013.01); *H04N 1/00045* (2013.01); *H04N 1/00063* (2013.01); *H04N 1/00071* (2013.01); *H04N 1/00588* (2013.01); *H04N 1/00689* (2013.01); *H04N 1/00758* (2013.01); *H04N 1/0461* (2013.01); *H04N 1/10* (2013.01); *H04N 1/19* (2013.01); *H04N 1/203* (2013.01); *H04N 1/2346* (2013.01); *H04N 2201/0081* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,320,029 B2* | 11/2012 | Kamei | ............... | H04N 1/00002 358/483 |
| 9,001,397 B2* | 4/2015 | Sakai | ..................... | H04N 1/121 235/474 |
| 2006/0245013 A1* | 11/2006 | Ikeno | ................. | H04N 1/00814 358/487 |
| 2012/0013957 A1* | 1/2012 | Honda | ............... | H04N 1/00551 358/498 |
| 2014/0022605 A1* | 1/2014 | Shimizu | ............. | H04N 1/00896 358/449 |
| 2014/0139895 A1* | 5/2014 | Osakabe | ............ | H04N 1/00615 358/498 |
| 2014/0233078 A1* | 8/2014 | Kurokawa | ......... | H04N 1/00588 358/498 |

FOREIGN PATENT DOCUMENTS

| | | | |
|---|---|---|---|
| JP | 2002-271589 | * | 9/2002 |
| JP | 2010-278563 | | 12/2010 |

* cited by examiner

*Primary Examiner* — Dung Tran
(74) *Attorney, Agent, or Firm* — Fitzpatrick, Cella, Harper & Scinto

(57) ABSTRACT

According to an embodiment of this invention, opening/closing of an ADF unit is correctly detected even under the influence of outside light. More specifically, a light source provided in a reading unit is turned on to irradiate a white board, and first data based on reflected light from the white board is obtained. Next, the light source provided in the reading unit is turned off, and second data based on reflected light from the white board is obtained. The difference between the first data and second data is compared with a predetermined threshold. It is determined based on the comparison whether the ADF unit is in an opened or closed state.

13 Claims, 7 Drawing Sheets

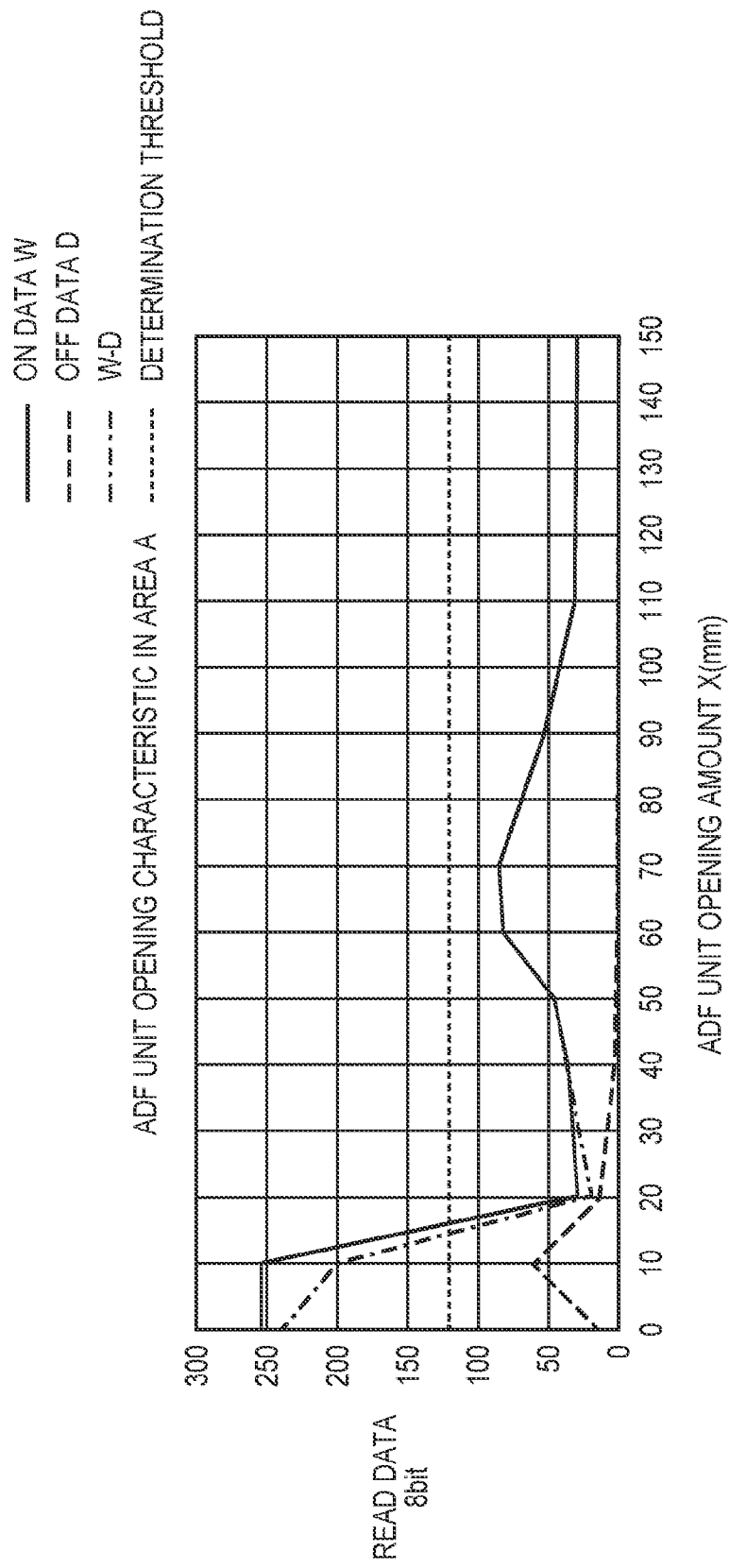

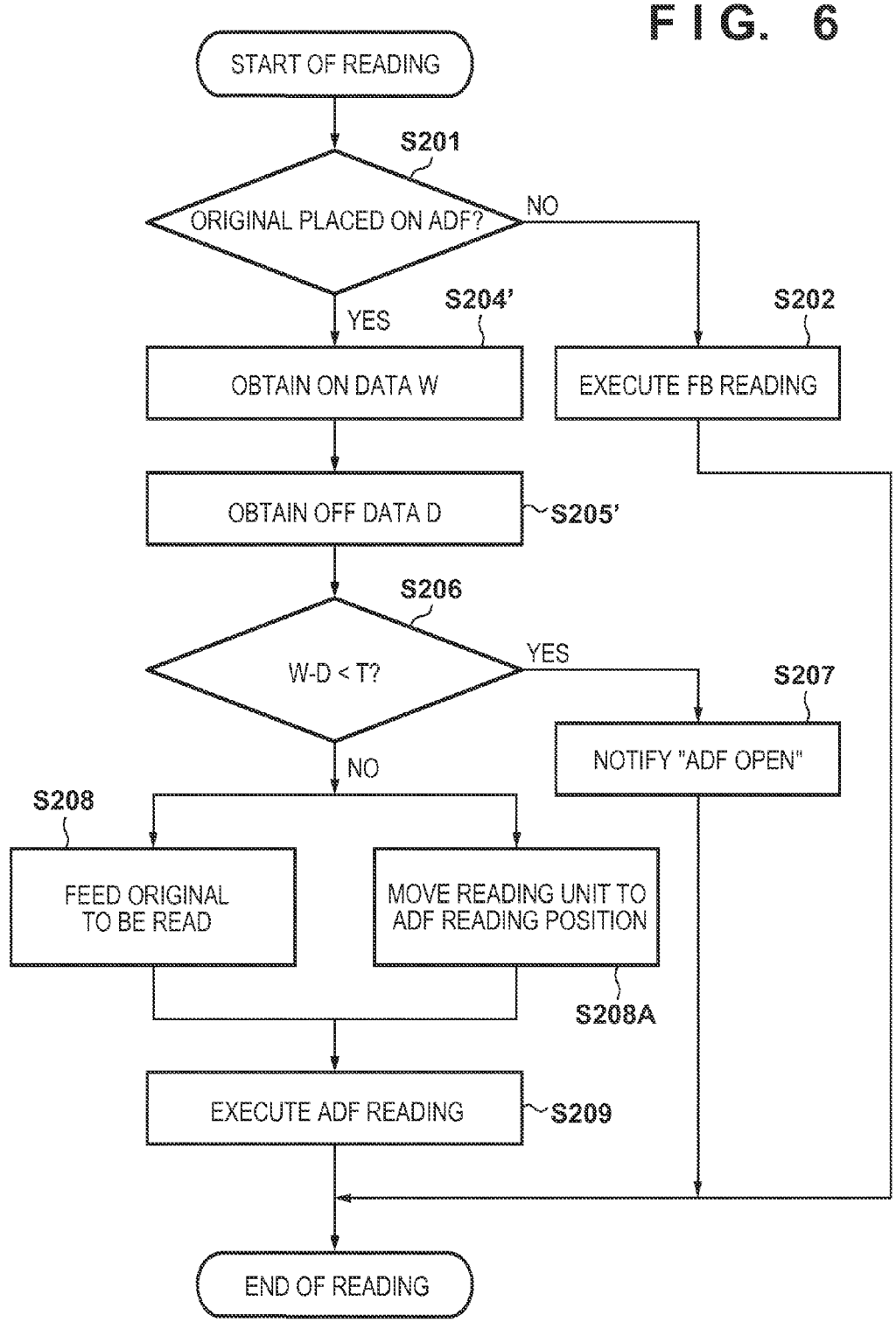

FIG. 7

| ORIGINAL PLACEMENT ON ADF UNIT | OPENING/CLOSING DETERMINATION USING READING UNIT 101 | OPENING/CLOSING DETERMINATION USING READING UNIT 205 | DETERMINATION RESULT |
|---|---|---|---|
| PRESENT | OPENED | OPENED | "ADF OPEN" NOTIFICATION |
| PRESENT | OPENED | CLOSED | "ADF ABNORMAL STATE" NOTIFICATION |
| PRESENT | CLOSED | OPENED | "ADF CONVEYANCE PATH ERROR" NOTIFICATION |
| PRESENT | CLOSED | CLOSED | ADF ORIGINAL FEEDING |
| ABSENT | OPENED | OPENED | THICK ORIGINAL FB READING |
| ABSENT | OPENED | CLOSED | "ADF ABNORMAL STATE" NOTIFICATION |
| ABSENT | CLOSED | OPENED | "FB ORIGINAL PLACEMENT ERROR" WARNING |
| ABSENT | CLOSED | CLOSED | THIN ORIGINAL FB READING |

IMAGE READING APPARATUS AND IMAGE READING METHOD

BACKGROUND OF THE INVENTION

1. Field of the Invention

The present invention relates to an image reading apparatus and an image reading method, and particularly to an image reading apparatus for optically reading an image from an original using an ADF (Automatic Document Feeding) unit and an image reading method.

2. Description of the Related Art

There is conventionally known an apparatus that detects opening/closing of an automatic document feeding unit (to be referred to as an ADF unit hereinafter) from the feature amount of a pattern image obtained by reading an ADF unit opening/closing detection mark by an image reading unit, like an image reading apparatus disclosed in FIG. 1 of Japanese Patent Laid-Open No. 2010-278563.

According to Japanese Patent Laid-Open No. 2010-278563, the lengths of read images of opening/closing detection marks M arranged at two points, that is, on the rear side close to the rotation shaft of the ADF unit and on the front side far from the rotation shaft are compared, thereby determining opening/closing of the ADF unit. This arrangement is disclosed in paragraph 0078 and FIGS. 3, 7, and 8 of Japanese Patent Laid-Open No. 2010-278563.

According to Japanese Patent Laid-Open No. 2010-278563, the density differences between read images of opening/closing detection marks M arranged at two points, that is, on the rear side close to the rotation shaft of the ADF unit and on the front side far from the rotation shaft and their peripheral portions are compared, thereby determining opening/closing of the ADF unit. This arrangement is disclosed in paragraphs 0095 to 0097 and FIG. 10 of Japanese Patent Laid-Open No. 2010-278563.

In the arrangement according to Japanese Patent Laid-Open No. 2010-278563 which compares the lengths of read images of the opening/closing detection marks M, however, if the influence of outside light that enters from the left side shown in FIG. 3 with respect to the light source is large, the length difference between the mark M on the rear side close to the rotation shaft of the ADF unit and that on the front side far from the rotation shaft becomes small. Hence, the detection accuracy may lower due to the influence of outside light.

Additionally, in Japanese Patent Laid-Open No. 2010-278563, if the influence of outside light that enters from the front side to the rear side of FIG. 10 with respect to the light source is large, the difference between the density difference between the mark M and its peripheral portion on the rear side close to the rotation shaft of the ADF unit and that on the front side far from the rotation shaft becomes small, and the detection accuracy may lower. At any rate, the influence of outside light affects the accuracy of determining the opening/closing of the ADF unit.

SUMMARY OF THE INVENTION

Accordingly, the present invention is conceived as a response to the above-described disadvantages of the conventional art.

For example, an image reading apparatus and image reading method according to this invention are capable of detecting opening/closing of the ADF unit regardless of the influence of outside light, reading a conveyance original in a state where the ADF unit is correctly closed, and performing high-quality reading.

According to one aspect of the present invention, there is provided an image reading apparatus comprising: a reading unit, having a light source and an image sensor, configured to read an image of an original on a platen glass; a feeding unit capable of opening/closing with respect to the platen glass and configured to feed the original; a white reference arranged facing the reading unit in a case where the feeding unit is closed; an obtaining unit configured to obtain first data by the image sensor when the light source is on, and obtain second data by the image sensor when the light source is off, prior to image reading; and a determination unit configured to determine an opened/closed state of the feeding unit based on the first data and the second data.

According to one aspect of the present invention, there is provided an image reading method of an image reading apparatus that causes a feeding unit capable of opening/closing with respect to a platen glass to feed an original and causes a reading unit to read an image of the original, the method comprising: obtaining first data by the reading unit when a light source provided in the reading unit is on before image reading; obtaining second data by the reading unit when the light source is off; and determining an opened/closed state of the feeding unit based on the first data and the second data.

The invention is particularly advantageous since opening/closing of a feeding unit, for example, an ADF unit can accurately be detected without using a unit dedicated to opening/closing detection regardless of the influence of outside light.

Further features of the present invention will become apparent from the following description of exemplary embodiments (with reference to the attached drawings).

BRIEF DESCRIPTION OF THE DRAWINGS

FIG. 5 is a graph showing the relationship between read data and the opening amount of the ADF unit in a specific reading area.

FIG. 6 is a flowchart showing image reading processing according to the second embodiment of the present invention.

FIG. 7 is a table showing a list of presence/absence of original placement on the ADF unit, opening/closing determination based on image data obtained by a reading unit 101, opening/closing determination based on image data obtained by a reading unit 205, and final determination results.

DESCRIPTION OF THE EMBODIMENTS

Exemplary embodiments of the present invention will now be described in detail in accordance with the accompanying drawings. It should be noted that the relative arrangement of the constituent components and the like set forth in the embodiments do not limit the scope of the present invention unless it is specifically stated otherwise.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Figure 1:
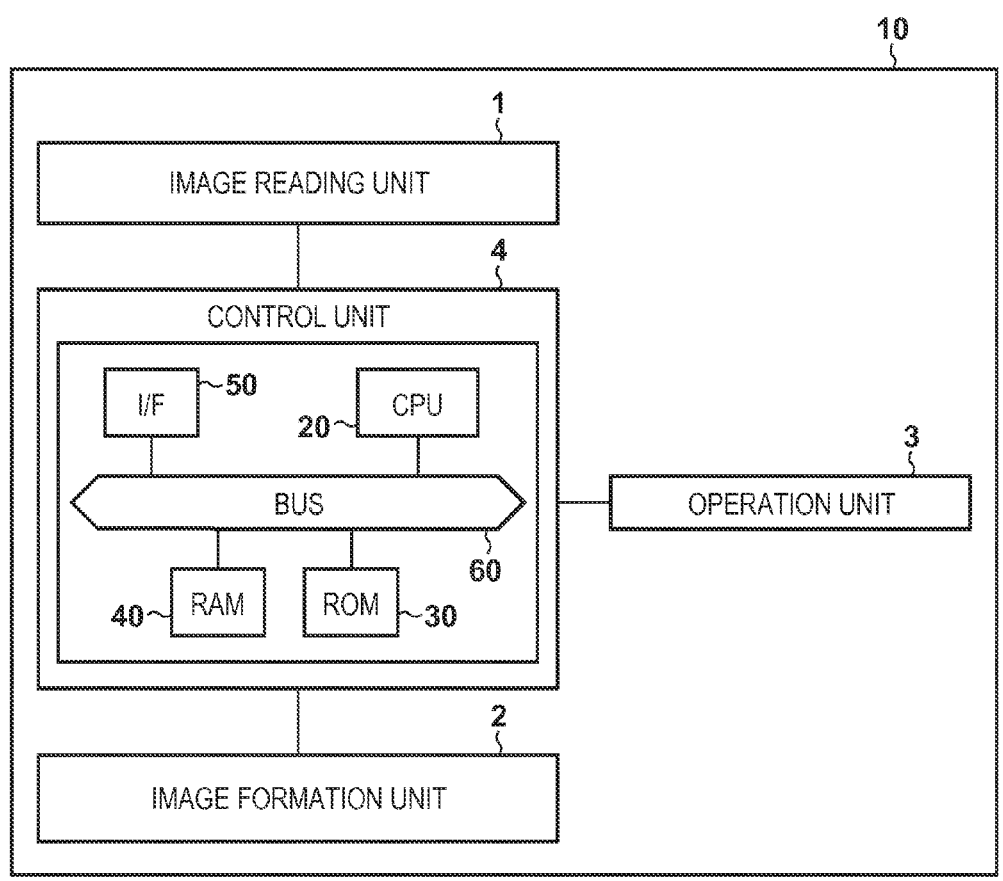
FIG. 1 is a block diagram showing the schematic arrangement of an image formation apparatus according to an embodiment of the present invention.

FIG. 1 is a block diagram showing the schematic arrangement of a multi-function printer (to be referred to as an MFP apparatus hereinafter) according to an exemplary embodiment of the present invention.

As shown in FIG. 1, an MFP apparatus 10 includes an image reading unit 1, an image formation unit 2, an operation unit 3, and a control unit 4.

The image reading unit 1 automatically feeds original pages placed on an ADF unit (to be described later) one by one and optically reads the image of the original. The image formation unit 2 includes a printer engine that performs image formation in accordance with an electrophotographic method or inkjet method, and forms an image based on image data obtained by reading an original by the image reading unit 1 or image data received from an external apparatus via an interface. The operation unit 3 includes an LED lamp, an LCD, a keyboard, and the like, and accepts an instruction from the user concerning image reading or image formation or notifies the user of a necessary message.

The control unit 4 includes a CPU 20 that controls the entire apparatus, a ROM 30 that stores control programs and various constant parameters, a RAM 40 used by the CPU 20 as a work area to execute a control program, and an external interface (I/F) 50 connected to an external apparatus. These constituent elements are connected to each other via a bus 60.

Hence, the MFP apparatus having the above-described arrangement can execute a scan function of reading an image of an original, a copy function of copying an image of an original, and a print function of printing an image based on image data from an external apparatus on a print medium such as a printing paper sheet. Instructions to execute these functions are input from the operation unit 3 or a host device (not shown) connected to the MFP apparatus.

FIGS. 2A to 2E are views showing the detailed structure of the image reading unit 1.

Figure 2A:
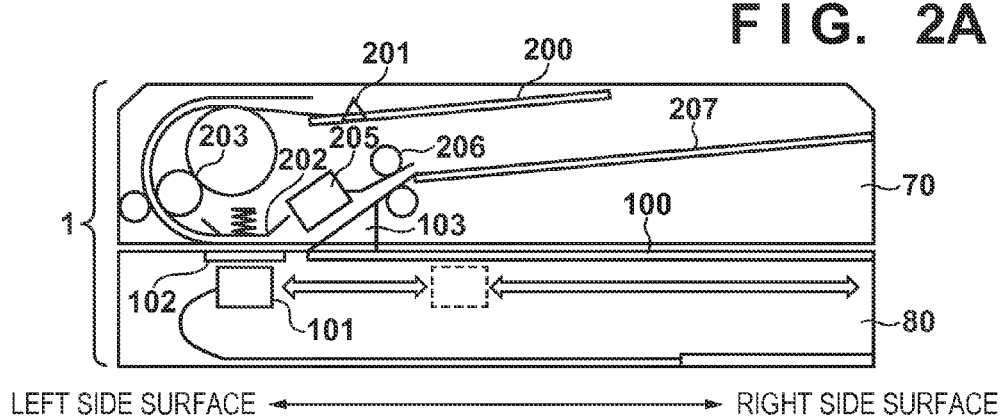
FIGS. 2A, 2B, 2C, 2D, and 2E are side sectional views showing the schematic arrangement of the image formation apparatus shown in FIG. 1.
Figures 2B, 2C:
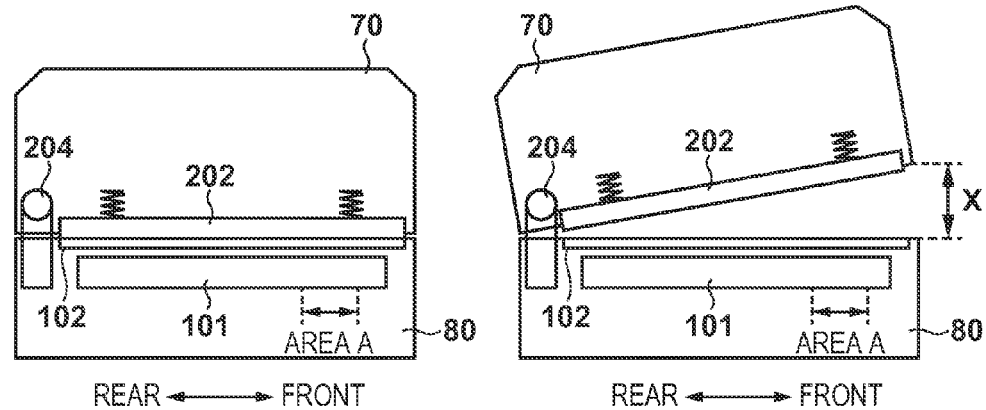
Figures 2D, 2E:
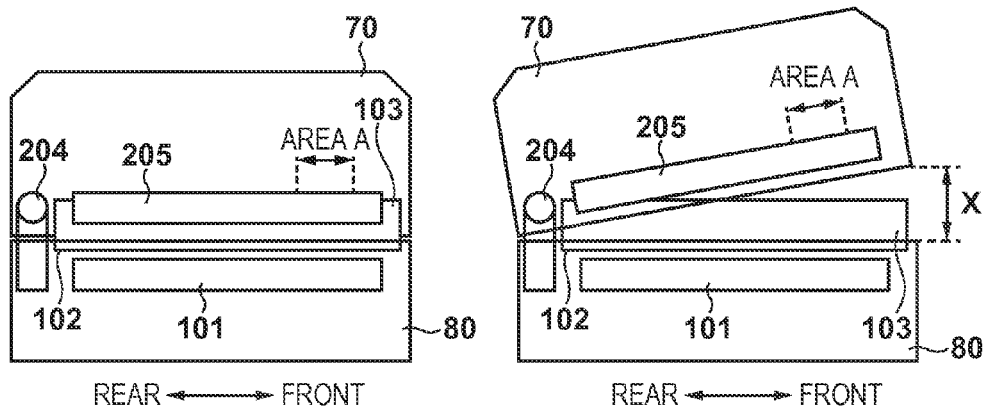

FIGS. 2A to 2E are side sectional views showing the structure of the image reading unit 1. Out of FIGS. 2A to 2E, FIG. 2A is a left/right side sectional view, and FIGS. 2B to 2E are front/rear side sectional views. The image reading unit 1 is formed from an ADF unit 70 and a flatbed (to be referred to as FB hereinafter) unit 80. The ADF unit 70 has a structure capable of opening/closing. As is apparent from FIGS. 2B to 2E, the ADF unit 70 can rotate about an open/close shaft (hinge) 204 provided on the rear side and open/close the front side. Note that FIGS. 2B and 2D show a case where the ADF unit 70 is closed, and FIGS. 2C and 2E show a case where the ADF unit 70 is open. "X" in FIGS. 2C and 2E indicates the opening amount of the ADF unit 70 from the closed state.

As shown in FIG. 2A, the ADF unit 70 includes a placement unit 200 to place an original, an original detection sensor 201 arranged at the distal end of the placement unit 200, a white board (white reference) 202, a feed roller 203, a reading unit 205, a discharge roller 206, and a discharge tray 207. On the other hand, the FB unit 80 includes a platen glass 100, a reading unit 101, a platen glass 102, and a white board (white reference) 103. The reading unit 101 includes a plurality of reading elements (line sensor) arrayed in a direction perpendicular to the drawing surface of FIG. 2A, a light source, and a lens, and can move in the direction of the arrow shown in FIG. 2A. The array direction of the plurality of reading elements is called a main scanning direction, and the moving direction of the reading unit 101 is called a sub-scanning direction. Hence, the main scanning direction corresponds to the rear/front direction in FIGS. 2B to 2E, and the sub-scanning direction corresponds to the left/right direction in FIG. 2A. Similarly, the reading unit 205 includes a plurality of reading elements (line sensors) arrayed in a direction perpendicular to the drawing surface of FIG. 2A, a light source, and a lens. Note that the reading unit 205 is fixed in the ADF unit 70.

The image reading unit 1 can place an original on the platen glass 100 and read an image, and can also place an original on the placement unit 200 of the ADF unit 70 and read an image by automatic feed. When placing an original on the platen glass 100 and reading an image, the reading unit 101 moves from the position shown in FIG. 2A to the position indicated by the dotted line and further moves in the direction of the arrow, thereby reading an image. On the other hand, when reading an image by automatic feed from the ADF unit 70, the reading unit 101 stands still at the position shown in FIG. 2A and reads an image by moving the original on the platen glass 102.

As shown in FIG. 2B, when the ADF unit 70 is closed, the white board (white reference) 202 moves to the position facing the reading unit 101. Similarly, as shown in FIG. 2D, when the ADF unit 70 is closed, the white board (white reference) 103 moves to the position facing the reading unit 205.

In image reading by automatic feed from the ADF unit 70, double-sided reading is also possible. In this case, by automatic feed from the ADF unit 70, the reading unit 101 reads an image on the obverse surface of an original on the platen glass 102. In addition, when the original is discharged to the discharge tray 207 by the discharge roller 206, another reading unit 205 reads an image on the reverse surface of the original.

Several embodiments of ADF unit opening/closing detection executed in image reading executed by the MFP apparatus having the above-described arrangement will be described next.

First Embodiment

Figure 3:
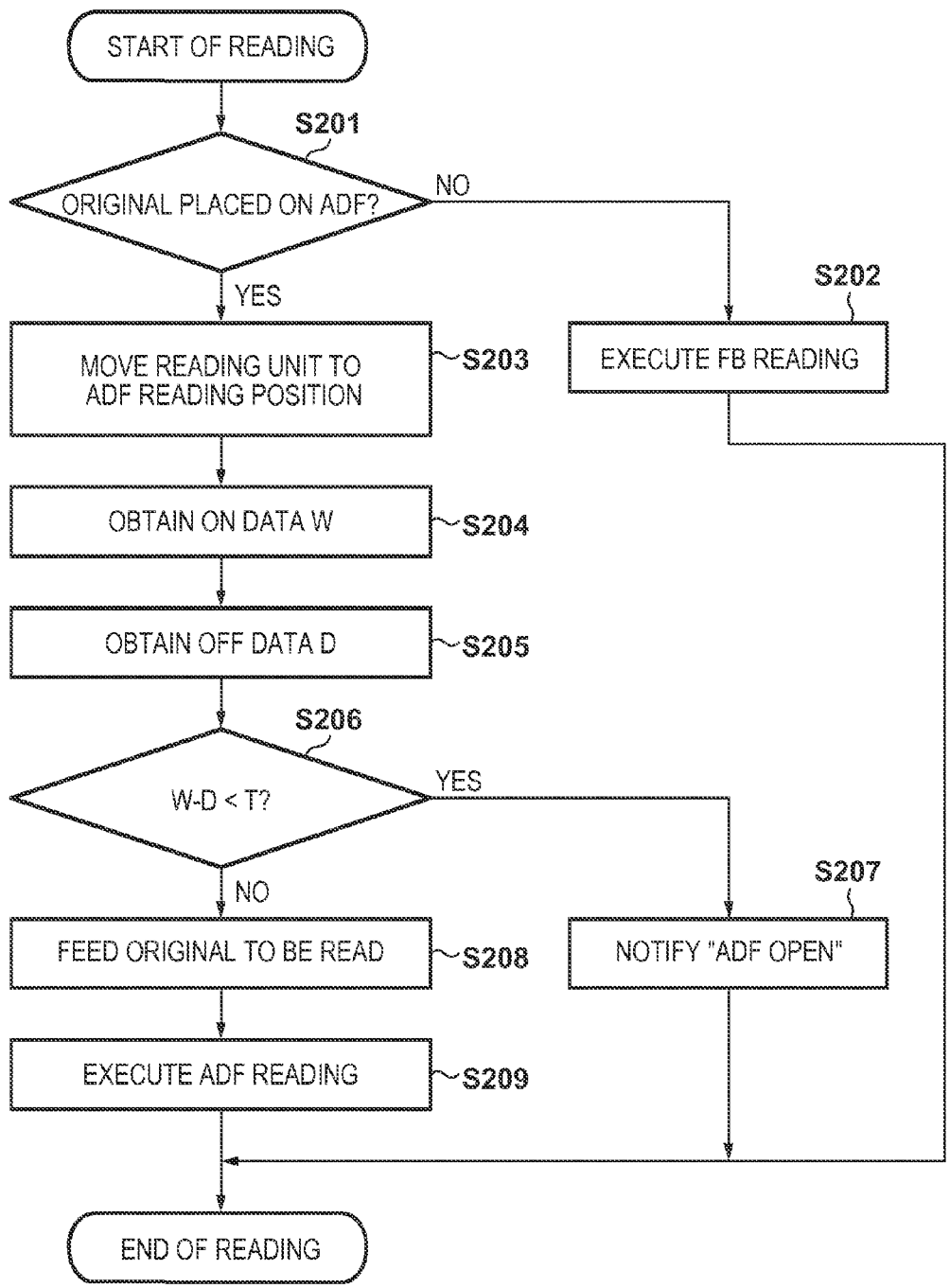
FIG. 3 is a flowchart showing image reading processing according to the first embodiment of the present invention.
Figure 4A:
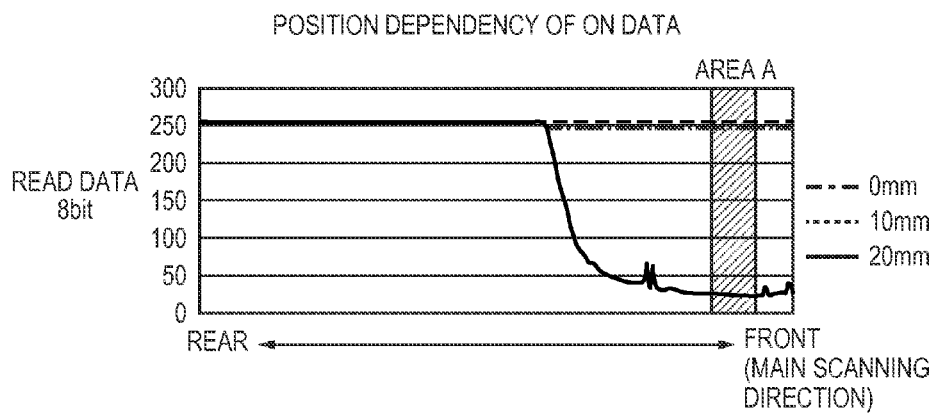
FIGS. 4A, 4B, and 4C are graphs showing the position dependency of the reading characteristic of a reading unit.
Figure 4B:
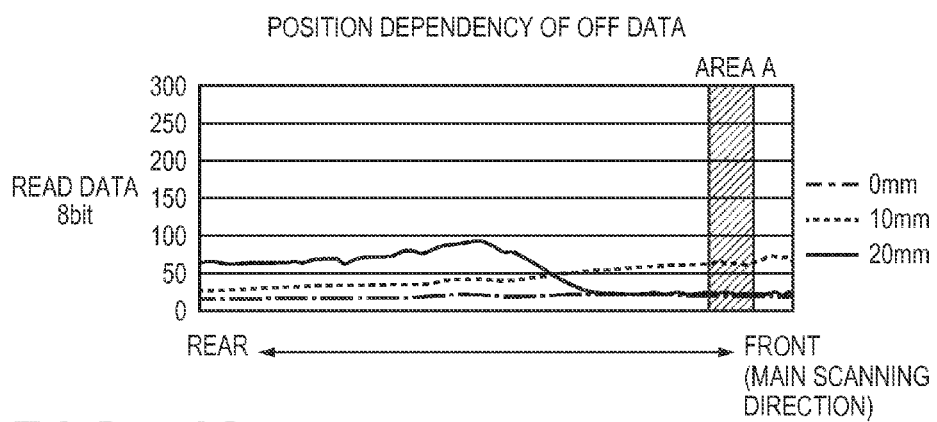
Figure 4C:
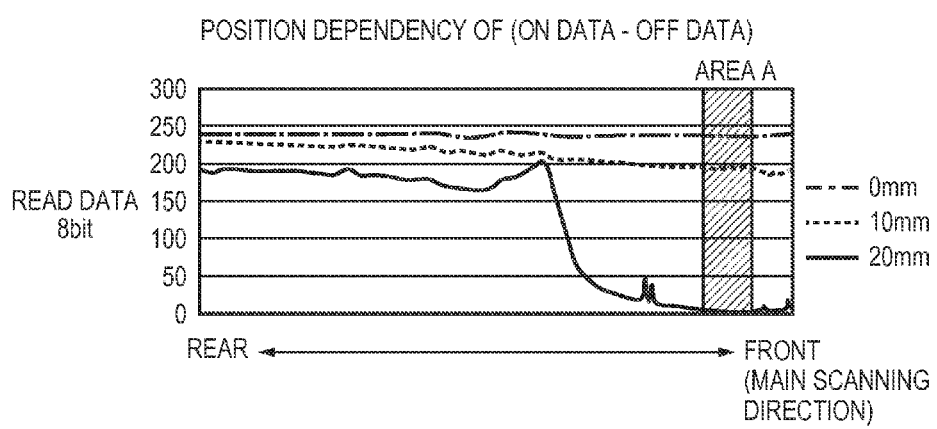

FIG. 3 is a flowchart showing image reading processing including ADF unit opening/closing detection according to the first embodiment. FIGS. 4A to 4C are graphs showing the opened/closed state of the ADF unit and the output state of a reading sensor.

Upon receiving a copy or scan execution instruction from an operation unit 3 shown in FIG. 1, an operation start instruction is sent to the image reading unit 1 via the control unit 4.

In response to the instruction, prior to image reading, in step S201, a signal from an original detection sensor 201 arranged at the distal end of the placement unit 200 of the ADF unit 70 of the image reading unit 1 shown in FIG. 2A is monitored to check whether an original is placed on the ADF unit 70. Upon determining that no original is placed on the ADF unit 70, an original is considered to be placed on the platen glass 100 of the FB unit 80. The process advances to step S202 to execute image reading (FB reading) by the FB unit 80. In step S202, the control unit 4 controls the driving unit (not shown) of a reading unit 101 to electrically scan the plurality of reading elements of the reading unit 101 to read the image of the original while moving the reading unit 101 in the sub-scanning direction, thereby obtaining two-dimensional image data. After that, the processing ends.

On the other hand, upon determining in step S201 that an original is placed on the ADF unit 70, the process advances to step S203, and the control unit 4 controls the above-described driving unit to move the reading unit 101 under the platen glass 102. This position is called an ADF original reading position.

In step S204, the light source (not shown) provided in the reading unit 101 is turned on, and reflected light from the white board 202 immediately above the platen glass 102 is read, thereby obtaining ON data W. In step S205, the light source provided in the reading unit 101 is turned off, and reflected light from the white board 202 is read, thereby obtaining OFF data D.

In step S206, the difference between the ON data W and the OFF data D obtained in steps S204 and S205 is calculated and compared with an ADF opening/closing determination threshold T, thereby checking whether the difference is smaller than the threshold. In a case where it is determined that W−D<T (the difference is smaller than the threshold), the process advances to step S207. In step S207, a message representing that the ADF unit 70 is open is displayed on the LCD of the operation unit 3, or a host device connected to the MFP apparatus and having issued the reading instruction is notified of it. After that, the reading operation ends without feeding the original from the ADF unit 70.

On the other hand, in a case where it is determined in step S206 that W−D≥T (the difference is equal to or larger than the threshold), the process advances to step S208. In step S208, the control unit 4 controls the feed roller 203 to feed the original from the placement unit 200. In step S209, while conveying the original, the reading unit 101 is driven to read the image of the original (ADF reading), thereby obtaining two-dimensional image data.

The relationship between the determination of step S206 and the opened/closed state of the ADF unit 70 will be described here.

FIGS. 4A to 4C are graphs showing the position dependency of the ON data W, OFF data D, and the difference data (W−D).

FIG. 4A shows the position dependency of the ON data W, FIG. 4B shows the position dependency of the OFF data D, and FIG. 4C shows the position dependency of the difference data (W−D). In FIGS. 4A to 4C, the ordinate represents a pixel value of image data obtained by reading reflected light from the white board 202, and the abscissa represents positions in the rear/front direction (main scanning direction) of the MFP apparatus shown in FIGS. 2B to 2E. "Rear" is the side close to the rotation shaft (hinge) of the ADF unit, and "front" is the side far apart from the rotation shaft. Note that image data is brightness data in which each pixel is represented by 8 bits. A value "255" indicates the highest brightness, and "0" indicates the lowest brightness. In FIGS. 4A to 4C, an alternate long and short dashed line indicates a brightness change in a case where an opening amount X of the ADF unit 70 is 0 mm (case where the ADF unit 70 is completely closed), a broken line indicates a brightness change in a case where the opening amount X is 10 mm, and a solid line indicates a brightness change in a case where the opening amount X is 20 mm.

If the ADF unit 70 is in a closed state, as shown in FIG. 2B, the ON data W obtained in step S204 has large values throughout the area in the main scanning direction based on the reflected light from the white board 202, as indicated by the alternate long and short dashed line in FIG. 4A. The OFF data D obtained in step S205 is not affected by outside light and therefore has small values throughout the area in the main scanning direction, as indicated by the alternate long and short dashed line in FIG. 4B. Hence, the difference (W−D) between the ON data W and the OFF data D has large values throughout the area in the main scanning direction, as indicated by the alternate long and short dashed line in FIG. 4C.

If the ADF unit 70 is in an opened state, as shown in FIG. 2C, the ON data W, the OFF data D, and the difference data (W−D) exhibit different characteristics in accordance with the opening amount X of the ADF unit 70. If the ADF unit is slightly open, for example, if the opening amount X is 10 mm (broken line), the ON data W has large values throughout the area in the main scanning direction because the reflected light from the light source is dominant, as shown in FIG. 4A. On the other hand, as for the OFF data D, outside light enters from the front side of the apparatus where the ADF unit 70 opens to form a gap to the rear side, and the light reflected by the white board 202 enters the reading unit 101. For this reason, the closer the position to the front side of the apparatus is, the larger the value of the OFF data D is, as indicated by the broken line in FIG. 4B. Hence, contrary to the characteristic shown in FIG. 4B, the closer the position to the front side of the apparatus is, the smaller the value of the difference data (W−D) is, as indicated by the broken line in FIG. 4C.

If the opening amount X increases to 20 mm, the light emitted by the light source of the reading unit 101 and reflected by the white board 202 hardly reaches the reading unit 101, as indicated by the solid line in FIG. 4A. For this reason, the ON data W on the front side of the apparatus abruptly becomes small. The OFF data D also has small values on the front side of the apparatus, as indicated by the solid line in FIG. 4B, because outside light reflected by the white board 202 hardly reaches the reading unit 101. Hence, the difference data (W−D) also has small values on the front side of the apparatus, as indicated by the solid line in FIG. 4C.

As can be seen from comparison of the position dependencies shown in FIGS. 4A to 4C, there is an output sensitive to a small change in the opening amount X as in an area A. In this embodiment, a portion on the front side of the apparatus, like the area A shown in FIGS. 2B and 2C or the area A shown in FIGS. 4A to 4C, is set to the output reference range of the reading unit 101. When generalized, the area A is set to a limited reading element area on the front side of the apparatus (a side spaced apart from the rotation shaft of the ADF unit) with respect to the center of the reading element array of the line sensor. The area A is set within the range of the line sensor ⅓ from the front side (the opposite side of the hinge).

FIG. 5 is a graph showing the relationship between the ON data W, the OFF data D, and the opening amount of the ADF unit in the area A. Referring to FIG. 5, the solid line indicates the ON data W, the broken line indicates the OFF data D, the alternate long and short dashed line indicates the difference data (W−D), and the dotted line indicates the ADF opening/closing determination threshold T.

As is apparent from FIG. 5, the detection accuracy can be raised by taking the intermediate value within the range where the value of the difference data (W−D) largely varies in accordance with a slight change in the opening amount X. Hence, in this embodiment, the threshold T is set to the intermediate value within the range of opening amount X from 10 mm to 20 mm.

If the opening amount X is 20 mm or more, outside light components that directly enter the reading unit 101 are dominant. In this case, if ADF unit opening/closing determination is performed using only the ON data W (solid line), a determination error may occur due to the influence of the outside light. On the other hand, as shown in FIG. 5, if the opening amount X is 20 mm or more, the OFF data D (dotted line) has almost the same value as the ON data W (solid line). For this reason, detection can be performed while avoiding the influence of outside light by using the difference data (W−D) (alternate long and short dashed line).

Hence, according to the above-described embodiment, reflected light from the white board is read in each of the ON and OFF states of the light source of the reading unit, and the difference between the data is compared with the threshold, thereby determining the opened/closed state of the ADF unit. In particular, since an area sensitive to a small change in the opening amount of the ADF unit is selected from the main scanning direction, and data obtained from reflected light obtained from the area is used, the opened/closed state of the ADF unit can accurately be detected.

Second Embodiment

FIG. 6 is a flowchart showing image reading processing including ADF unit opening/closing detection according to the second embodiment. Note that the same step numbers as those described in the first embodiment with reference to FIG. 3 denote the same processing steps in FIG. 6, and a description thereof will be omitted.

If no original is placed on a placement unit 200 of an ADF unit 70, processes of steps S201 and S202 are executed, as in the first embodiment. On the other hand, if an original is placed on the placement unit 200 of the ADF unit 70, ADF unit opening/closing detection is executed using a reading unit 205 provided in the ADF unit 70.

First, in step S204', a light source (not shown) provided in reading unit 205 is turned on, and reflected light from a white board 103 on an FB unit 80 is read, thereby obtaining ON data W. In step S205', the light source of the reading unit 205 is turned off, and the white board 103 is read, thereby obtaining OFF data D.

FIGS. 2D and 2E show a state in which the white board 103 on the FB unit 80 is read using the reading unit 205. FIG. 2D shows a case where the ADF unit 70 is closed, and FIG. 2E shows a case where the ADF unit 70 is open.

Subsequently, processes of steps S206 and S207 are executed, as in the first embodiment. In a case where it is determined in step S206 that W−D≥T (the difference is equal to or larger than the threshold), the original is fed from the placement unit 200 in step S208. At the same time, in step S208A, a control unit 4 controls the above-described driving unit to move the reading unit 101 under the platen glass 102. After that, the process of step S209 is executed, as in the first embodiment.

Hence, according to the above-described embodiment, although the relative positional relationship between the reading unit and the white board used to detect the opened/closed state of the ADF unit is reverse to that in the first embodiment, the opened/closed state of the ADF unit can accurately be detected, as in the first embodiment.

Third Embodiment

An example will be described here in which opening/closing detection of the ADF unit 70 by the reading unit 101 and opening/closing detection of the ADF unit 70 by the reading unit 205 are performed regardless of the state of a signal output from the original detection sensor 201.

FIG. 7 is a table showing a list of presence/absence of original placement on the ADF unit, opening/closing determination based on image data obtained by the reading unit 101, opening/closing determination based on image data obtained by the reading unit 205, and final determination results.

As shown in the list of FIG. 7, the state of an image reading unit 1 can be grasped more finely based on the combination of three states, that is, "ADF original placement", "ADF unit opening/closing detection by the reading unit 101", and "ADF unit opening/closing detection by the reading unit 205".

Hence, according to the above-described embodiment, it is also possible to discriminate an original type such as thick or thin and also detect an abnormality in the ADF original conveyance path.

In the above embodiments, an example in which original image reading is performed by an MFP has been described. However, the present invention is not limited to this. For example, a flatbed type scanner apparatus (image reading apparatus) having a single function may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-153151, filed Jul. 28, 2014, which is hereby incorporated by reference herein in its entirety.

What is claimed is:

1. An image reading apparatus comprising:
a flatbed scanner unit configured to read an original on a platen glass, the flatbed scanner unit having a first reading unit having a light source and an image sensor;
a feeding unit openable and closable with respect to the platen glass and configured to feed and to read an original, wherein the feeding unit comprises a second reading unit having a light source and an image sensor;
a first white reference, provided on the flatbed scanner unit, arranged to face the second reading unit when the feeding unit is closed;
a second white reference, provided in the feeding unit, arranged to face the first reading unit when the feeding unit is closed;
a control unit configured to control at least one of the first reading unit and the second reading unit to obtain first data by the image sensor of at least one of the first reading unit and the second reading unit when the light source is on, and to obtain second data by the image sensor of at least one of the first reading unit and the second reading unit when the light source is off, prior to image reading;
wherein the control unit is further configured to determine an opened/closed state of the feeding unit based on the first data and the second data.

2. The image reading apparatus according to claim 1, wherein the first and second reading units each includes a line sensor with a plurality of elements arrayed, and
the control unit obtains the first data and the second data from outputs of several elements within a range spaced apart from a shaft to rotate the feeding unit with respect to a center of the line sensor.

3. The image reading apparatus according to claim 2, wherein the several elements are included within a range of the line sensor ⅓ from an opposite side of the shaft with respect to an arrayed direction of the plurality of elements.

4. The image reading apparatus according to claim 1, wherein the second white reference has a reference surface parallel to the platen glass, and
the first white reference has a reference surface inclined with respect to the platen glass.

5. The image reading apparatus according to claim 1, wherein
the control unit obtains the first data and the second data for each of the first reading unit and the second reading unit, and determines a state of the feeding unit.

6. The image reading apparatus according to claim 1, wherein the first reading unit includes a line image sensor provided under the platen glass to read a first surface of the original fed by the feeding unit, and the second reading unit includes a line image sensor provided in the feeding unit to read a second surface of the original fed by the feeding unit, and
the first and the second surfaces of the original are read simultaneously.

7. The image reading apparatus according to claim 1, further comprising a sensor configured to detect whether the original is placed on the feeding unit,
wherein, in accordance with a detection result of the sensor, the control unit selects one of the first reading unit and the second reading unit to be used for obtaining the first data and the second data.

8. The image reading apparatus according to claim 1, wherein the control unit controls the apparatus to suppress execution of feeding by the feeding unit in a case where it is determined that the feeding unit is opened.

9. The image reading apparatus according to claim 1, wherein the image reading apparatus is included in a multi-function printer configured to print an image read by the image reading apparatus on a print medium.

10. An image reading apparatus comprising:
a flatbed scanner unit having a platen glass on which an original to be read is placed and a white reference;
a feeding unit having a feed roller, a light source and an image sensor, the feeding unit being configured to feed and to read an original, wherein the feeding unit is openable and closable with respect to the platen glass and the image sensor faces the white reference provided on the flatbed scanner unit when the feeding unit is closed; and
a controller configured to, prior to image reading, control the apparatus to obtain first data by the image sensor when the light source is on, obtain second data by the image sensor when the light source is off,
wherein the controller is further configured to determine an opened/closed state of the feeding unit with respect to the platen glass, based on the first data and the second data.

11. The image reading apparatus according to claim 10, wherein the white reference is provided on the platen glass, and has a reference surface inclined with respect to the platen glass.

12. The image reading apparatus according to claim 10, wherein the controller controls the apparatus to suppress execution of feeding by the feeding unit in a case where it is determined that the feeding unit is opened.

13. A multifunction printer comprising the image reading apparatus according to claim 10, wherein the multifunction printer is configured to print an image read by the image reading apparatus on a print medium.

* * * * *